(12) United States Patent
Ohsumi

(10) Patent No.: US 7,937,486 B2
(45) Date of Patent: May 3, 2011

(54) INFORMATION PROCESSING SYSTEM, INFORMATION PROVIDING APPARATUS, INFORMATION PROVIDING METHOD, INFORMATION PROCESSING APPARATUS, INFORMATION PROCESSING METHOD, AND PROGRAM

(75) Inventor: Tomoharu Ohsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 951 days.

(21) Appl. No.: 11/338,813

(22) Filed: Jan. 25, 2006

(65) Prior Publication Data

US 2006/0184648 A1 Aug. 17, 2006

(30) Foreign Application Priority Data

Feb. 4, 2005 (JP) ................ P2005-028913

(51) Int. Cl.
*G06F 15/16* (2006.01)
*G06Q 30/00* (2006.01)
(52) U.S. Cl. ............ 709/231; 709/230; 705/26
(58) Field of Classification Search .......... 709/201–203, 709/217–219, 230–237; 705/26
See application file for complete search history.

(56) References Cited

U.S. PATENT DOCUMENTS

| | | | | |
|---|---|---|---|---|
| 6,701,248 B2* | 3/2004 | Petzold et al. | ............. | 701/202 |
| 7,293,085 B2* | 11/2007 | Isozu | ............. | 709/224 |
| 2003/0050746 A1* | 3/2003 | Baiada et al. | ............. | 701/3 |
| 2003/0050846 A1* | 3/2003 | Rodon | ............. | 705/26 |
| 2003/0140148 A1* | 7/2003 | Kondo et al. | ............. | 709/228 |
| 2003/0140156 A1* | 7/2003 | Karim | ............. | 709/231 |
| 2003/0229631 A1* | 12/2003 | Arend et al. | ............. | 707/3 |
| 2004/0024812 A1* | 2/2004 | Park et al. | ............. | 709/203 |
| 2004/0064369 A1* | 4/2004 | Kato | ............. | 705/14 |
| 2004/0143564 A1* | 7/2004 | Gross et al. | ............. | 707/1 |
| 2005/0021420 A1 | 1/2005 | Michelitsch et al. | | |
| 2005/0163481 A1* | 7/2005 | Hirai | ............. | 386/69 |
| 2007/0032887 A1* | 2/2007 | Muroi et al. | ............. | 700/19 |
| 2007/0276904 A1* | 11/2007 | Satou | ............. | 709/203 |
| 2008/0091776 A1* | 4/2008 | Miyamoto | ............. | 709/203 |

FOREIGN PATENT DOCUMENTS

| | | |
|---|---|---|
| EP | 1 300 781 A2 | 4/2003 |
| JP | 2002-132818 | 5/2002 |
| WO | WO 2004/109543 A1 | 12/2004 |

* cited by examiner

*Primary Examiner* — Wing F Chan
*Assistant Examiner* — Razu A Miah
(74) *Attorney, Agent, or Firm* — Finnegan, Henderson, Farabow, Garrett & Dunner, LLP

(57) ABSTRACT

Systems and methods are disclosed for determining the preferences of a user of an information processing apparatus. This may be achieved, for example, by an information providing apparatus sending sample content data representing the contents database to the information processing apparatus. Then, the sample content data may be evaluated, and the evaluation results may be sent to the information providing apparatus. The information providing apparatus may then derive user preference information based on the evaluations results.

14 Claims, 10 Drawing Sheets

F I G . 1
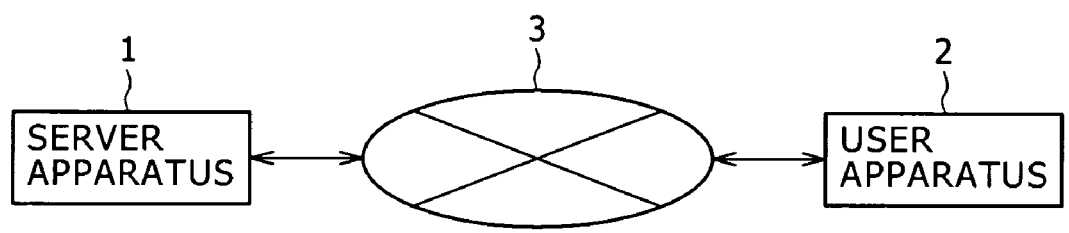

USER APPARATUS SIDE

SERVER APPARATUS SIDE

INFORMATION PROCESSING SYSTEM, INFORMATION PROVIDING APPARATUS, INFORMATION PROVIDING METHOD, INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2005-028913 filed with the Japanese Patent Office on Feb. 4, 2005, the entire contents of which being incorporated herein by reference.

BACKGROUND OF THE INVENTION

The present invention relates to an information processing system, an information providing apparatus, an information providing method, an information processing apparatus, an information processing method, and a program. More particularly, the invention relates to an information processing system, an information providing apparatus, an information providing method, an information processing apparatus, an information processing method, and a program for allowing an information providing apparatus acting as a server to provide contents to a user who uses an information processing apparatus serving as a client, the provided contents being deemed preferred by the user even if the server has no information about the user.

Various server-client systems have been proposed in recent years. Each of these systems is made up of a server and a client or clients. Each client is formed by a user's apparatus. The server acquires information about what is preferred by each user so that the server may selectively provide the user in question with information compatible with the users' preferences.

In such a system, the information submitted from each client to the server is the user's personal information composed of user preferences such as the genre of preferred TV programs. Such personal information needs some kind of protection for security. One technique of protecting personal information is disclosed illustratively in Japanese Patent Laid-open No. 2002-1093714. The disclosed technique involves allowing the user to select his or her information that is deemed appropriate to disclose to the server as a way of protecting personal information.

SUMMARY OF THE INVENTION

Although the techniques such as the above-cited one protect the user's information that is personally deemed inappropriate to disclose, the traditional systems let the server retain whatever has been disclosed about the user. The information submitted to the server by the user's permission also constitutes a kind of personal information.

The above state of affairs might be bypassed by the user answering a simple questionnaire or the like from which the server would collect user preferences. The server might then provide its clients with information in keeping with the user preferences thus acquired, without the users' submitting their personal information directly to the server. This scheme, however, cannot be implemented by the server-client systems proposed so far.

Meanwhile, there have been proposed cooperative filtering-based server-client systems utilizing cooperative filters that select information fit for each user requesting information offerings by analyzing other user's evaluations. This kind of systems selectively provides information without using the personal information about the user who requests information offerings. Because of the nature of their algorithms, these systems are incapable of providing the user with contents which have not been evaluated by other users or by a sufficient number of them.

For example, it is difficult for any cooperative filtering-based system to provide any user with unpublished or brand-new contents that have yet to be evaluated by many other users when they are ready to be offered.

The present invention has been made in view of the above circumstances and provides arrangements such that even if an information providing apparatus acting as a server has no information about a user who uses an information processing apparatus serving as a client, the server can provide the client with contents that conform to the user's preferences.

In carrying out the present invention and according to one embodiment thereof, there is provided an information processing system having an information providing apparatus and an information processing apparatus interconnected via a network; wherein the information providing apparatus includes: a generating device generating sample data including metadata about contents ready to be provided, before transmitting the generated sample data to the information processing apparatus; and a providing device providing the information processing apparatus with contents selected from the ready contents in accordance with preferences of a user of the information processing apparatus, the user preferences being derived from a result of evaluation of the sample data by the information processing apparatus; and wherein the information processing apparatus includes: an evaluating device evaluating the sample data transmitted from the information providing apparatus, the evaluation being made in accordance with the user preferences, before transmitting the result of the evaluation to the information providing apparatus; and an output controlling device outputting the contents which have been transmitted from the information providing apparatus after being selected thereby based on the user preferences derived from the evaluation result.

According to another embodiment of the present invention, there is provided an information providing apparatus for providing contents to an information processing apparatus connected via a network, the information providing apparatus including: a generating device generating sample data including metadata about contents ready to be provided, before transmitting the generated sample data to the information processing apparatus; and a providing device providing the information processing apparatus with contents selected from the ready contents in accordance with preferences of a user of the information processing apparatus, the user preferences being derived from a result of evaluation of the sample data by the information processing apparatus.

One preferred structure of the information providing apparatus according to the present invention may include a storing device storing personal information offered by the user of the information processing apparatus; wherein the providing device may determine the user preferences based not only on the result of evaluation of the sample data but also on the personal information stored in the storing device.

According to a further embodiment of the present invention, there is provided an information providing method for use with an information providing apparatus for providing contents to an information processing apparatus connected via a network, the information providing method including the steps of: generating sample data including metadata about contents ready to be provided, before transmitting the generated sample data to the information processing apparatus; and providing the information processing apparatus with contents selected from the ready contents in accordance with preferences of a user of the information processing apparatus, the user preferences being derived from a result of evaluation of the sample data by the information processing apparatus.

According to an even further embodiment of the present invention, there is provided a first program for causing a computer to carry out a procedure for providing contents to an information processing apparatus connected via a network, the procedure including the steps of: generating sample data including metadata about contents ready to be provided, before transmitting the generated sample data to the information processing apparatus; and providing the information processing apparatus with contents selected from the ready contents in accordance with preferences of a user of the information processing apparatus, the user preferences being derived from a result of evaluation of the sample data by the information processing apparatus.

According to a still further embodiment of the present invention, there is provided an information processing apparatus connected to an information providing apparatus via a network, the information processing apparatus including: an evaluating device evaluating sample data including metadata about contents ready to be provided, the evaluation being made in accordance with preferences of a user of the information processing apparatus, the sample data being transmitted from the information providing apparatus, before transmitting a result of the evaluation to the information providing apparatus; and an output controlling device outputting the contents which have been transmitted from the information providing apparatus after being selected thereby based on the user preferences derived from the evaluation result.

In one preferred structure of the information processing apparatus according to the present invention, the evaluating device may evaluate the sample data using the user preferences obtained by a learning process based at least on either an operation history of the user or information input by the user.

According to a yet further embodiment of the present invention, there is provided an information processing method for use with an information processing apparatus connected to an information providing apparatus via a network, the information processing method including the steps of: evaluating sample data including metadata about contents ready to be provided, the evaluation being made in accordance with preferences of a user of the information processing apparatus, the sample data being transmitted from the information providing apparatus, before transmitting a result of the evaluation to the information providing apparatus; and outputting the contents which have been transmitted from the information providing apparatus after being selected thereby based on the user preferences derived from the evaluation result.

According to anther embodiment of the present invention, there is provided a second program for causing a computer to carry out a procedure of an information processing apparatus connected to an information providing apparatus via a network, the procedure including the steps of: evaluating sample data including metadata about contents ready to be provided, the evaluation being made in accordance with preferences of a user of the information processing apparatus, the sample data being transmitted from the information providing apparatus, before transmitting a result of the evaluation to the information providing apparatus; and outputting the contents which have been transmitted from the information providing apparatus after being selected thereby based on the user preferences derived from the evaluation result.

Where the inventive information processing system made up of an information providing apparatus and an information processing apparatus is in use, the information providing apparatus first generates sample data including metadata about contents ready to be provided, before transmitting the generated sample data to the information processing apparatus. The information providing apparatus further provides the information processing apparatus with contents selected from the ready contents in accordance with preferences of a user of the information processing apparatus, the user preferences being derived from a result of evaluation of the sample data by the information processing apparatus.

With the inventive information processing system in operation, the information processing apparatus evaluates the sample data transmitted from the information providing apparatus, the evaluation being made in accordance with the user preferences, before transmitting the result of the evaluation to the information providing apparatus. The information processing apparatus further outputs the contents which have been transmitted from the information providing apparatus after being selected thereby based on the user preferences derived from the evaluation result.

Where the information providing apparatus, information providing method, and first program according to the present invention are in use, sample data is first generated which includes metadata about contents ready to be provided, and the generated sample data is transmitted to the information processing apparatus. The information processing apparatus is then provided with contents selected from the ready contents in accordance with preferences of the user of the information processing apparatus, the user preferences being derived from the result of evaluation of the sample data by the information processing apparatus.

Where the information processing apparatus, information processing method, and second program according to the present invention are in use, sample data is first evaluated which includes metadata about contents ready to be provided, the evaluation being made in accordance with preferences of the user of the information processing apparatus, the sample data being transmitted from the information providing apparatus, before the result of the evaluation is transmitted to the information providing apparatus. The contents are then output which have been transmitted from the information providing apparatus after being selected thereby based on the user preferences derived from the evaluation result.

According to the present invention, as outlined above, it is possible for the information providing apparatus to provide a user with contents conforming to the preferences of that user who requests information offerings even if there is no information about the user in the apparatus.

According to the invention, it is also possible for the user of the information processing apparatus to receive contents conforming to his or her preferences without submitting any personal information to the information providing apparatus.

BRIEF DESCRIPTION OF THE DRAWINGS

Further objects and advantages of the present invention will become apparent upon a reading of the following description and appended drawings in which:

FIG. 1 is a block diagram showing a typical configuration of a server-client system to which the present invention is applied;

DETAILED DESCRIPTION OF THE PREFERRED EMBODIMENTS

Figure 2:
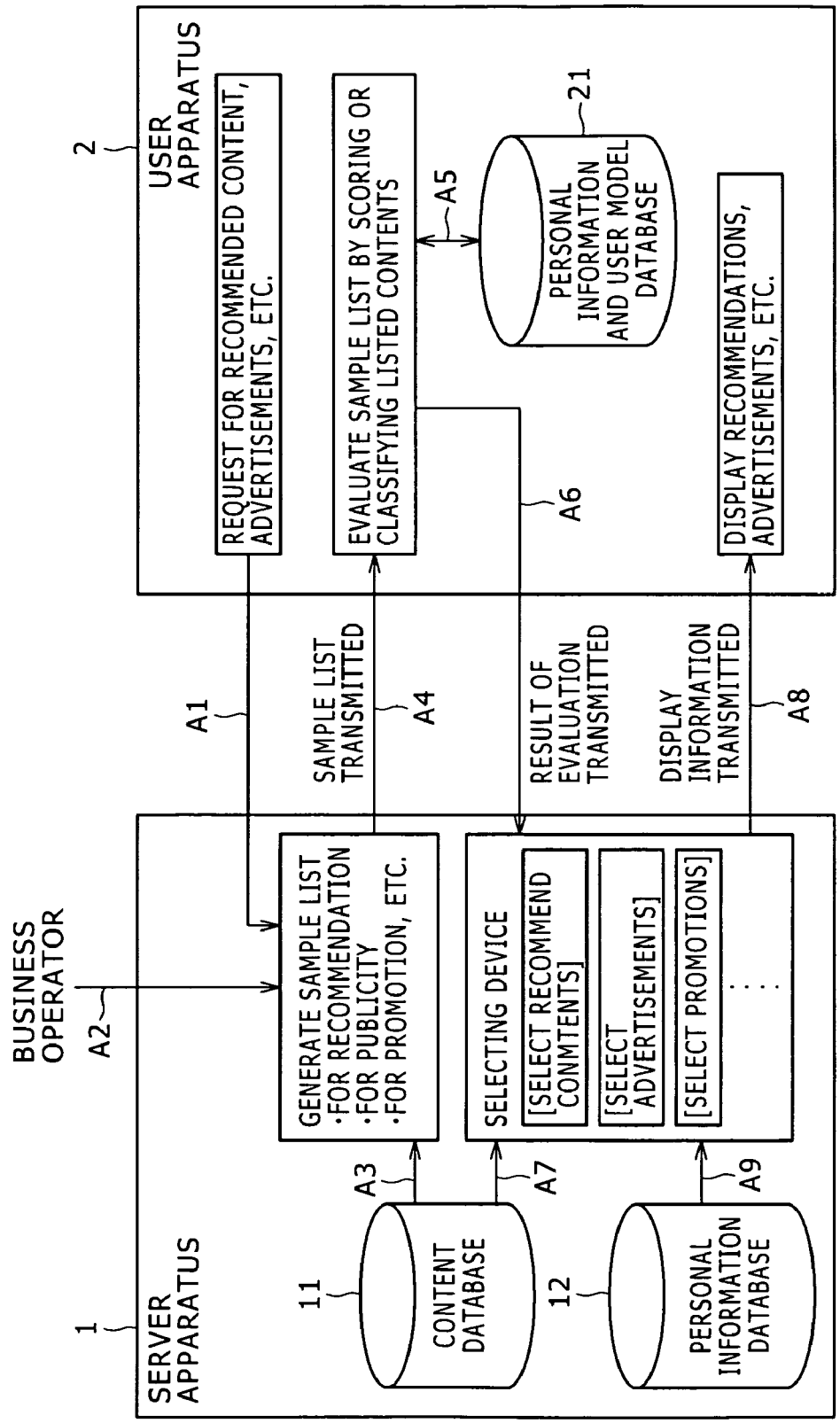
FIG. 2 is a schematic view showing data exchanges carried out between the server and user apparatuses indicated in FIG. 1.

What is described below as the preferred embodiments of the present invention corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

Furthermore, the description below of the preferred embodiments does not claim to include all examples corresponding to the whole claims. In other words, the description hereunder does not limit or deny any inventive entities which are not covered by the appended claims of the present invention but which may be added or brought about by this applicant in the future by divisional application or by amendment.

One embodiment of the present invention is an information processing system (e.g., server-client system in FIG. 1) having an information providing apparatus (e.g., server apparatus 1 in FIG. 1) and an information processing apparatus (e.g., user apparatus 2 in FIG. 1) interconnected via a network, wherein the information providing apparatus includes: a generating device (e.g., sample list generating device 52 in FIG. 5) generating sample data including metadata about contents ready to be provided, before transmitting the generated sample data to the information processing apparatus; and a providing device (e.g., selecting device 55 in FIG. 5) providing the information processing apparatus with contents selected from the ready contents in accordance with preferences of a user of the information processing apparatus, the user preferences being derived from a result of evaluation of the sample data by the information processing apparatus.

In the inventive information processing system above, the information processing apparatus includes: an evaluating device (e.g., learning device 72 in FIG. 6) evaluating the sample data transmitted from the information providing apparatus, the evaluation being made in accordance with the user preferences, before transmitting the result of the evaluation to the information providing apparatus; and an output controlling device (e.g., display controlling device 75 in FIG. 6) outputting the contents which have been transmitted from the information providing apparatus after being selected thereby based on the user preferences derived from the evaluation result.

Another embodiment of the present invention is an information providing apparatus (e.g., server apparatus 1 in FIG. 1) for providing contents to an information processing apparatus (e.g., user apparatus 2 in FIG. 1) connected via a network, the information providing apparatus including: a generating device (e.g., sample list generating device 52 in FIG. 5) generating sample data including metadata about contents ready to be provided, before transmitting the generated sample data to the information processing apparatus; and a providing device (e.g., selecting device 55 in FIG. 5) providing the information processing apparatus with contents selected from the ready contents in accordance with preferences of a user of the information processing apparatus, the user preferences being derived from a result of evaluation of the sample data by the information processing apparatus.

One preferred structure of the inventive information providing apparatus may include a storing device (e.g., personal information database 12 in FIG. 5) storing personal information offered by the user of the information processing apparatus; wherein the providing device may determine the user preferences based not only on the result of evaluation of the sample data but also on the personal information stored in the storing device.

Figure 7:
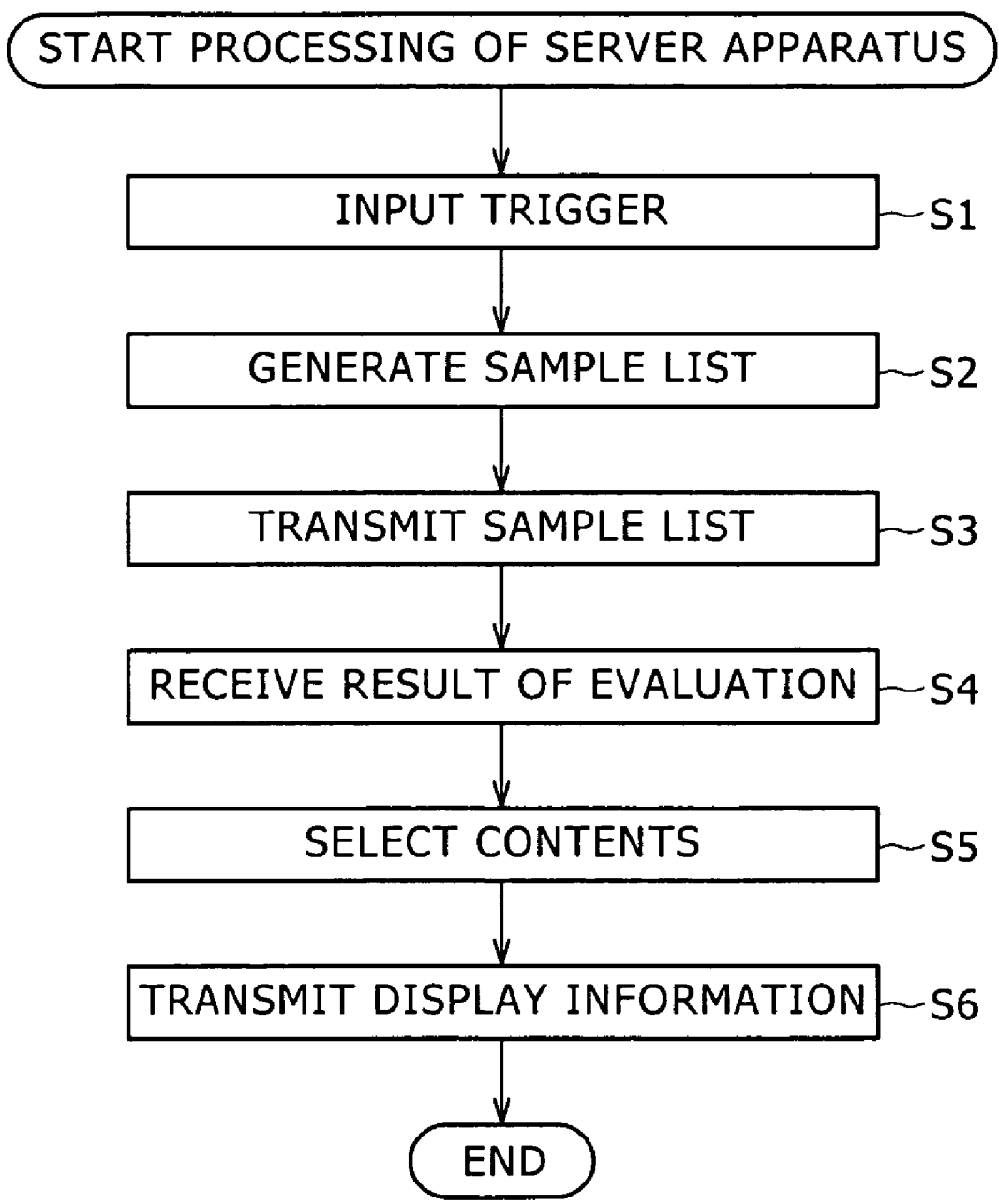
FIG. 7 is a flowchart of steps constituting a typical process performed by the server apparatus.

A further embodiment of the present invention is an information providing method for use with an information providing apparatus (e.g., server apparatus 1 in FIG. 1) for providing contents to an information processing apparatus (e.g., user apparatus 2 in FIG. 1) connected via a network, the information providing method including the steps of: generating (e.g., step S2 in FIG. 7) sample data including metadata about contents ready to be provided, before transmitting the generated sample data to the information processing apparatus; and providing (e.g., step S5 in FIG. 7) the information processing apparatus with contents selected from the ready contents in accordance with preferences of a user of the information processing apparatus, the user preferences being derived from a result of evaluation of the sample data by the information processing apparatus.

An even further embodiment of the present invention is a program for causing a computer to carry out a procedure including the same steps as those of the inventive information providing method outlined above.

A still further embodiment of the present invention is an information processing apparatus (e.g., user apparatus 2 in FIG. 1) connected to an information providing apparatus (e.g., server apparatus 1 in FIG. 1) via a network, the information processing apparatus including: an evaluating device (e.g., learning device 72 in FIG. 6) evaluating sample data including metadata about contents ready to be provided, the evaluation being made in accordance with preferences of a user of the information processing apparatus, the sample data being transmitted from the information providing apparatus, before transmitting a result of the evaluation to the information providing apparatus; and an output controlling device (e.g., display controlling device 75 in FIG. 6) outputting the contents which have been transmitted from the information providing apparatus after being selected thereby based on the user preferences derived from the evaluation result.

A yet further embodiment of the present invention is an information processing method for use with an information processing apparatus (e.g., user apparatus 2 in FIG. 1) connected to an information providing apparatus (e.g., server apparatus 1 in FIG. 1) via a network, the information processing method including the steps of: evaluating (e.g., step S12 in FIG. 8) sample data including metadata about contents ready to be provided, the evaluation being made in accordance with preferences of a user of the information processing apparatus, the sample data being transmitted from the information providing apparatus, before transmitting a result of the evaluation to the information providing apparatus; and outputting (e.g., step S15 in FIG. 8) the contents which have been transmitted from the information providing apparatus after being selected thereby based on the user preferences derived from the evaluation result.

Another embodiment of the present invention is a program for causing a computer to carry out a procedure including the same steps as those of the inventive information processing method outlined above.

The preferred embodiments of the present invention will now be described in more detail with reference to the accompanying drawings. FIG. 1 is a block diagram showing a typical configuration of a server-client system embodying the present invention.

As shown in FIG. 1, the server-client system is constituted by a server apparatus 1 and a user apparatus 2 interconnected via a network 3. The server apparatus 1 is managed illustratively by a business operator offering services using the server-client system (the business operator will be called the system business operator where appropriate). The user apparatus 2 is managed by a user who makes use of the offered services.

Although only one user apparatus 2 is shown in FIG. 1, this is only an example and is not limitative of the invention. Obviously, the system may also be constituted by the server apparatus 1 and a plurality of user apparatuses 2 connected to the network 3.

In response to requests coming from the user apparatus 2 over the network 3, the server apparatus 1 determines the preferences of the user of the apparatus 2. The server 1 then provides the user apparatus 2 with contents conforming to the user preferences thus determined.

The server apparatus 1 includes a database that contains diverse contents such as information about movies, pieces of music, and other products (called items hereunder), as well as advertisements and promotional information provided by other business operators marketing products. The contents are stored in the database in a manner ready to be provided upon access.

The user apparatus 2 displays (i.e., outputs) the contents sent from the server 1 in keeping with the preferences of the apparatus user. The user of the apparatus 2 can then receive contents conforming to his or her preferences. The server-client system of FIG. 1 is capable of providing such contents to the user without the user's submitting his or her personal information to the server apparatus 1 by illustratively answering preference-related questionnaires prepared by the system business operator.

Described below with reference to FIG. 2 are data exchanges performed between the server apparatus 1 and user apparatus 2 in FIG. 2 until contents are provided to the user apparatus 2. Although not shown in FIG. 2, the exchanges between the server apparatus 1 and the user apparatus 2 are carried out over the network 3 indicated in FIG. 1.

A request (for contents) may be delivered from the user apparatus 2 as indicated by an arrow A1, or an instruction may be given by the system business operator (i.e., administrator of the server apparatus 1) as denoted by an arrow A2. Any of these requests or instructions serves as a trigger that causes the server apparatus 1 to generate a sample list.

If contents are provided by the system business operator in self-determining fashion, i.e., on a so-called "push" basis, instructions from the system business operator are used as the trigger for generating sample lists. Alternatively, the generation of a sample list may be started when a predetermined time of day is reached.

The sample list is generated on the basis of the contents stored in a content database 11 as indicated by an arrow A3. The sample list is illustratively composed of a list in which content identification information about some contents selected from ready contents held in the content database 11 is associated with metadata (i.e., attribute information) about the contents in question. That is, when certain contents are selected for inclusion in a sample list, that sample list is generated in such a manner that the metadata about the selected contents is generated and registered in association with the identification information about the contents in question. The metadata includes information such as content genres.

The sample list thus generated by the server apparatus 1 is transmitted to the user apparatus 2 as indicated by an arrow A4.

A personal information and user model database 21 furnished in the user apparatus 2 accommodates the user's operation history so far or the preference information entered by the user illustratively in keeping with preferred content genres. Upon receipt of a sample list from the server apparatus 1, the received sample list is evaluated (regarding the contents whose metadata and identification information are found in the list) in accordance with the metadata in the list and based on the preference information retrieved from the personal information and user model database 21 as indicated by an arrow A5.

Figure 3A:
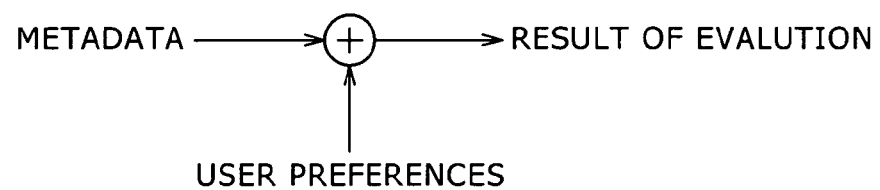
FIGS. 3A and 3B are schematic views showing how the server and user apparatuses typically operate for their processing.

More specifically, as shown in FIG. 3A, the user apparatus 2 admits as its input the metadata included in the sample list and the preference information retrieved from the personal information and user model database 21, and outputs the result of the evaluation. Illustratively, the evaluation result may include the scores of the individual contents included in the sample list and information about the classification of the contents.

The result of the sample list evaluation is transmitted to the server apparatus 1 as indicated by an arrow A6. Upon receipt of the evaluation result, the server apparatus 1 determines the preferences of the user of the apparatus 2 according to the result (i.e., of the evaluation, plus the content metadata sent as part of in the sample list).

Figure 3B:
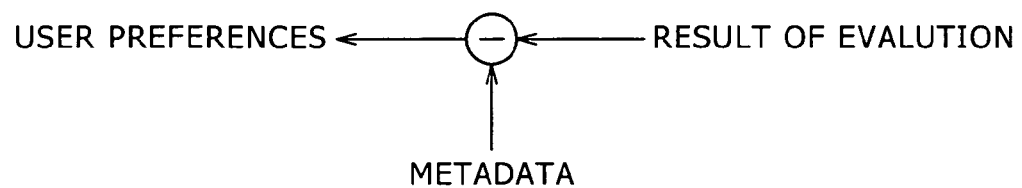

More specifically, as shown in FIG. 3B, the server apparatus 1 admits as its input the evaluation result received from the user apparatus 2 and the metadata transmitted to the user apparatus 2 as part of the sample list, and outputs the user preferences determined accordingly.

When the user's preferences have been determined, suitable contents (items, advertisements, promotions, etc.) are selected accordingly. Display information for displaying the selected contents is then transmitted to the user apparatus 2 as indicated by an arrow AB. Upon receipt of the display information, the user apparatus 2 displays the contents selected by the server apparatus 1.

The data exchanges outlined above allow the server apparatus 1 to select and provide the contents conforming to each user's preferences without referencing that user's personal information retained in the user apparatus 2. The only information sent from the user apparatus 2 to the server 1 as the basis on which to select contents is the result of the sample list evaluation made by the user apparatus 2, i.e., information about the scores and classification of the contents proposed by the server apparatus 1. What is not involved here are the user's responses to the questionnaires or the like offered by the system business operator or other kinds of information directly representing the user's preferences.

The server apparatus 1 may transmit a sample list containing the metadata about, say, unpublished tunes to find out whether the user likes them or not. If the user exhibits a preference for such tunes, then the server apparatus 1 may offer the user other unpublished tunes that have yet to be evaluated by other users.

Alternatively, the user's personal information may be offered to the server apparatus 1. In such a case, the user is authenticated upon each access or upon each session, before the user's preference information is retrieved from a personal information database 12 as indicated by an arrow A9 in FIG. 2. The contents to be sent to the user apparatus 2 are selected on the basis of both the user's preference information and in accordance with the personal information retrieved from the personal information database 12. The personal information database 12 retains users' personal information which was registered by the users beforehand and which denotes the users' preferences.

Where the personal information thus prepared and the results of sample list evaluations are utilized, it is possible to modify the stored personal information in accordance with the newly acquired evaluation results. The modified user information allows the system to make a more appropriate selection of contents than before.

The result of the sample list evaluation is deemed to represent the user's current preferences (i.e., preferences at the time of the request for contents). As opposed to previously prepared personal information, i.e., the user's past preference information, the user's current preference information permits the system to select contents that better reflect the user's present taste.

The process performed by the server apparatus 1 and the process carried out by the user apparatus 2 in executing the above data exchanges will be discussed later individually with reference to the accompanying flowcharts.

Figure 4:
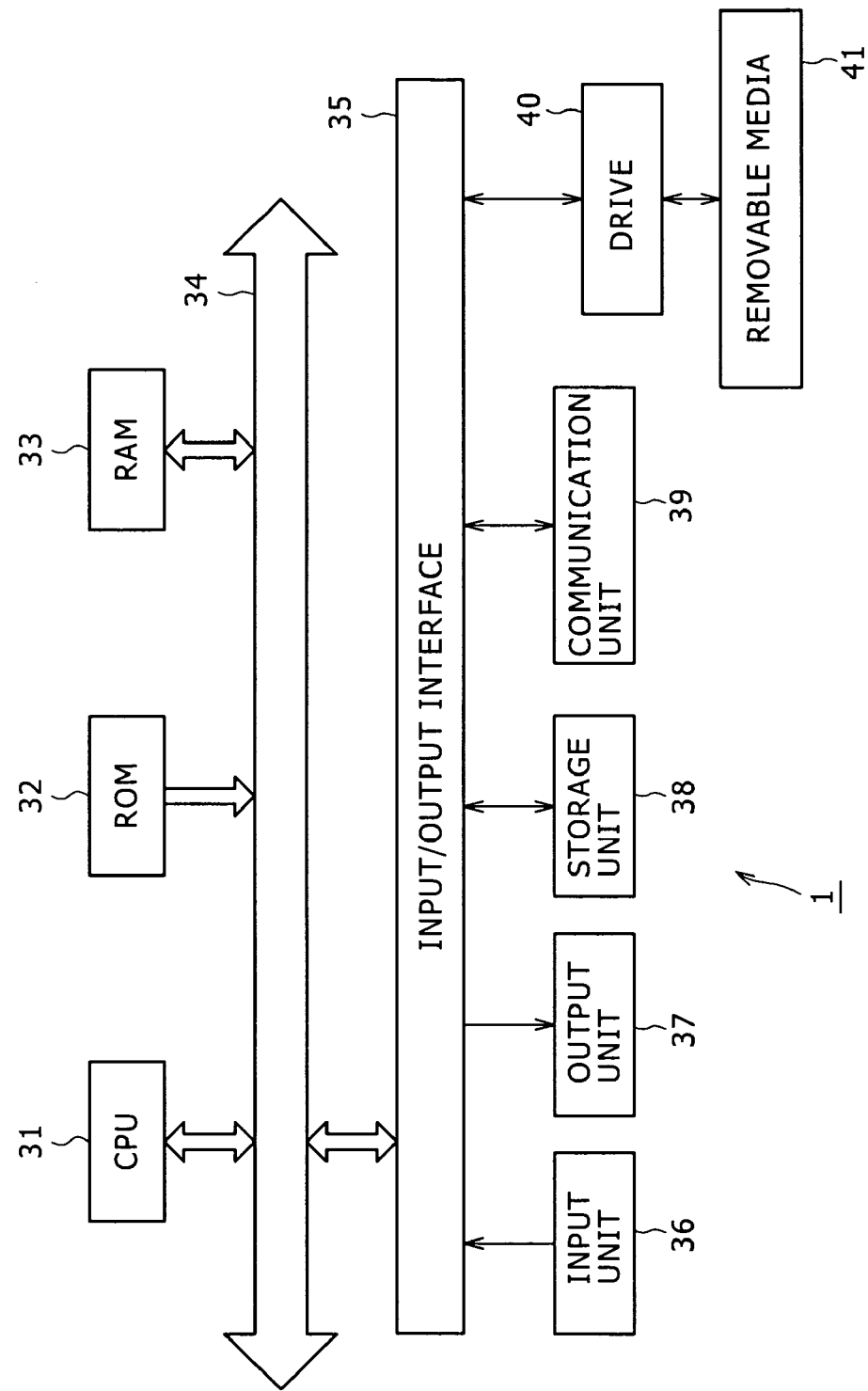
FIG. 4 is a block diagram showing a typical hardware structure of the server apparatus.

FIG. 4 is a block diagram showing a typical hardware structure of the server apparatus 1 in FIG. 1.

In FIG. 4, a CPU (central processing unit) 31 performs various processes in keeping with the programs held in a ROM (read only memory) 32 or according to the programs loaded from a storage unit 38 into a RAM (random access memory) 33. The RAM also accommodates data that may be needed by the CPU 31 in carrying out its processing.

The CPU 31, ROM 32, and RAM 33 are interconnected via a bus 34. An input/output interface 35 is also connected to the bus 34.

The input/output interface 35 is connected to an input unit 36, an output unit 37, the storage unit 38, and a communication unit 39. The input unit 36 is illustratively made up of a keyboard and a mouse. The output unit 37 includes a display such as an LCD (liquid crystal display) and speakers. The storage unit 38 is typically formed by a hard disk drive. The communication unit 39 conducts communications with other apparatus over the network 3.

A drive 40 is connected to the input/output interface 35 as needed. Removable media 41 such as a magnetic disk, an optical disk, a magneto-optical disk, or a semiconductor memory may be loaded into the drive 40. The computer programs that may be retrieved from the loaded medium are installed as needed into the storage unit 38.

The user apparatus 2 in FIG. 1 has the same structure as that shown in FIG. 4. In the description that follows, the structure in FIG. 4 may be cited in explaining the structure of the user apparatus 2.

Figure 5:
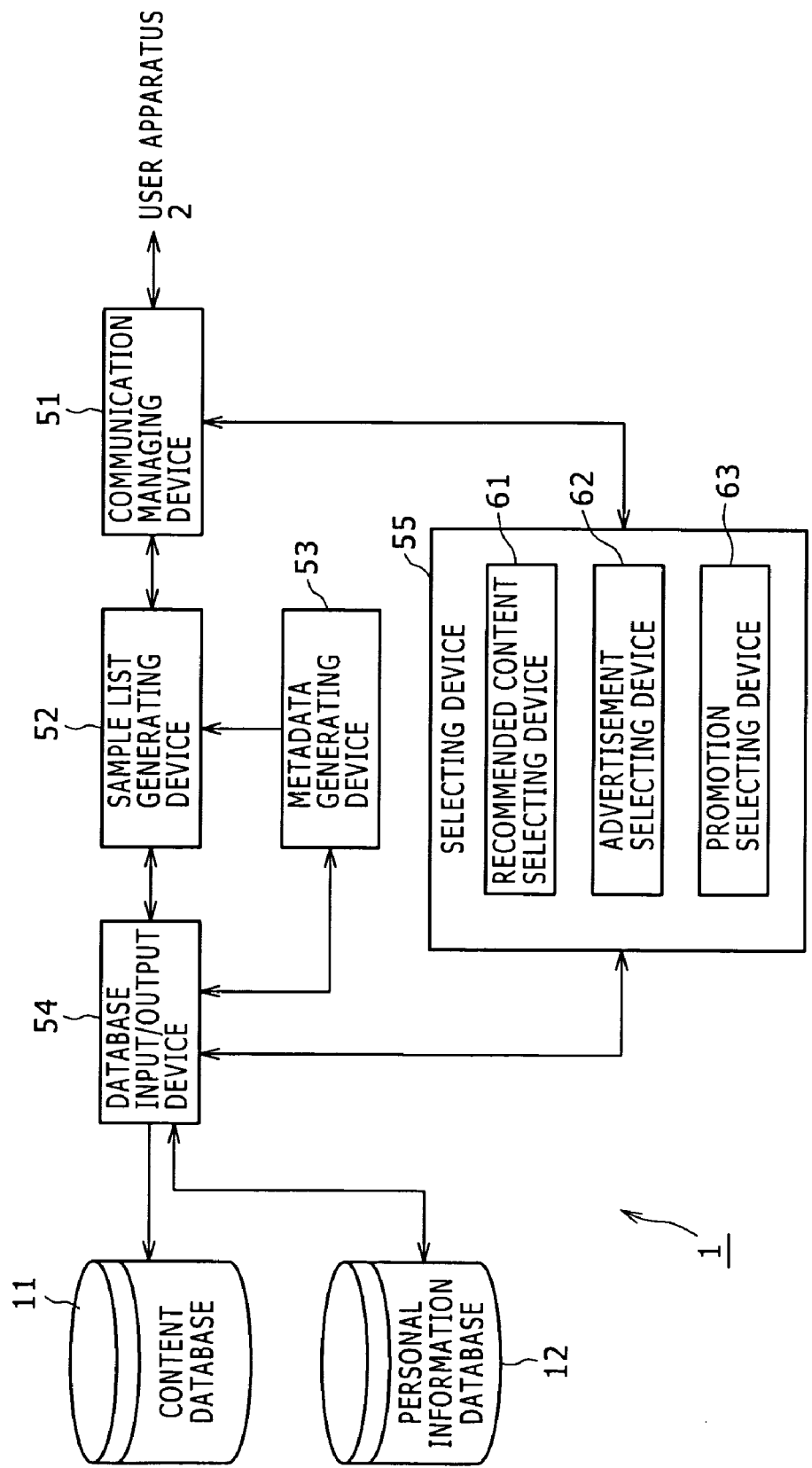
FIG. 5 is a block diagram showing a typical functional structure of the server apparatus.

FIG. 5 is a block diagram showing a typical functional structure of the server apparatus 1. The functional devices shown in FIG. 5 are implemented at least partially by the CPU 31 in FIG. 4 as it carries out appropriate programs.

A communication managing device 51 controls the communication unit 39 and manages communications conducted with the user apparatus 2. Communications with the user apparatus 2 are executed under a general-purpose protocol such as HTTP (Hyper Text Transfer Protocol). Transmission paths may be protected by encryption. The data to be transmitted and received is put in XML (extensible Markup Language) format or the like. XML tags or similar means are used to identify the types of communications (e.g., sample lists, results of evaluations, recommendations, advertisements, promotions, etc.).

Upon receipt of a sample list from a sample list generating device 52, or when receiving the contents selected by a selecting device 55 for transmission to the user apparatus 2, the communication managing device 51 forwards the received information to the user apparatus 2. On receiving the result of a sample list evaluation from the user apparatus 2, the communication managing device 51 outputs the received result to the selecting device 55.

The sample list generating device 52 generates a sample list in a suitably timed manner such as when a request is received from the user apparatus 2. Illustratively, the sample list generating device 52 selects appropriate contents from among those held in the content database 11 and associates metadata about the selected contents with identification information about the contents of interest in list form, thereby generating a sample list. When any content is selected for inclusion in the sample list, a metadata generating device 53 supplies the metadata about the selected content to the sample list generating device 52.

The contents in the sample list are selected from those in the content database 11 either randomly or according to a specific algorithm. Alternatively, the contents in the list may be selected as desired by the system business operator or other entities.

When certain contents are selected for inclusion in the sample list by the sample list generating device 52, the metadata generating device 53 retrieves the selected contents from the content database 11 via a database input/output device 54 so as to generate metadata about the retrieved contents. For example, if a content read from the content database 11 is a piece of music, the metadata generating device 53 analyzes the waveform of the music to find the tempo and rhythm of the tune, and extracts metadata representative of the music genre attributable to the detected tempo and rhythm.

The metadata generating device 53 outputs the generated metadata to both the sample list generating device 52 and the selecting device 55. The metadata is further stored into the content database 11 as needed through the database input/output device 54.

The database input/output device 54 is connected to the content database 11 and personal information database 12. In operation, the database input/output device 54 manages retrieval of data from the content database 11 and personal information database 12, as well as writing of data to the content database 11 and personal information database 12.

The selecting device 55, as shown in FIG. 3B, determines the user's preferences based on the result of the sample list evaluation coming from the communication managing device 51 and on the metadata (generated by the metadata generating device 53) transmitted to the user apparatus 2 as part of the sample data. With the user preferences determined, the selecting device 55 selects suitable contents accordingly from the content database 11. Upon content selection, the selecting device 55 may utilize personal information held in the personal information database 12.

The selecting device 55 is illustratively made up of a recommended item selecting device 61, an advertisement selecting device 62, and a promotion selecting device 63.

The recommended item selecting device 61 selects recommended contents (i.e., items to be provided to the user) from the items stored in the content database 11 illustratively as follows:

(1) A predetermined number of recommended items are selected from the content database 11, the selected items being those that gained high scores (i.e., evaluations) from the user or those deemed to be highly similar to a plurality of conforming items under a particular classification. Alternatively, a threshold conformity value may be set up so that any items whose degrees of conformity to user preferences are below that value will not be selected. This measure reduces the user's awkwardness in the face of unfamiliar items that are recommended. The degrees of similarity and conformity (i.e., scores) are calculated by use of the metadata about the items.

(2) The filtering technique such as cooperative filtering and/or the data mining technique (statistics and rules) is used to select the items with high scores or the items that are highly likely to be utilized (i.e., purchased, watched, or consumed) together with the items grouped in a particular classification, from a list of evaluation results. The filtering technique and data mining technique make use of a plurality of users' usage history data retained in the server apparatus 1.

The recommended items thus selected are displayed on the user apparatus 2 illustratively in the form of a list of identifiers, images and texts associated with the items.

The advertisement selecting device 62 selects the advertisement to be presented to the user from among the advertisements stored in the content database 11. The advertisements are selected illustratively in the same manner as the recommended item selecting device 61 makes its selections.

In selecting advertisements, the attributes of targeted users may be designated so as to better reflect the intentions of the sponsors. For example, from among the evaluation results sent form the user apparatus 2, the contents with high degrees of conformity are extracted and their attributes are checked against candidate advertisements for a match of target attributes. Any matching advertisements are highly evaluated and are selected for presentation to the user. When a sample list containing metadata about advertisements has been transmitted to the user apparatus 2, the result of the evaluation is checked for highly scored advertisements or for advertisements that fall under a particular classification. These advertisements are then selected.

The promotion selecting device 63 selects the promotions to be presented to the user from among the promotions stored in the content database 11. The promotions are selected illustratively in the same manner as the recommended item selecting device 61 makes its selections.

The contents thus selected are output to the communication managing device 51. From the communication managing device 51, the contents are transmitted to the user apparatus 2.

Upon transmission of a plurality of contents (i.e., content display information) selected in the manner described above to the user apparatus 2, the order in which the contents are to be displayed on a display unit of the user apparatus 2 (i.e., from the top down on the screen) may be selected in a number of ways: by score, by date of creation, on a random basis, or in order of priorities established by the system business operator.

The result of the sample list evaluation sent from the user apparatus 2 may be retained for a predetermined time period (varied as desired) per user or per session in the server apparatus 1. In such cases, the server apparatus 1 may select contents and send them to the user apparatus 2 in response to the latter's each request without transmitting any sample list regarding that request. The contents are selected on the basis of the evaluation results held in the server apparatus 1. Where contents are transmitted by the server apparatus 1 in self-determining fashion (i.e., not in response to requests from the user apparatus 2), the evaluation results held per user or per session may also be utilized.

Returning to the explanation of FIG. 5, the content database 11 accommodates such contents as items, advertisements, and promotions. The personal information database 12 stores personal information entered by users.

Figure 6:
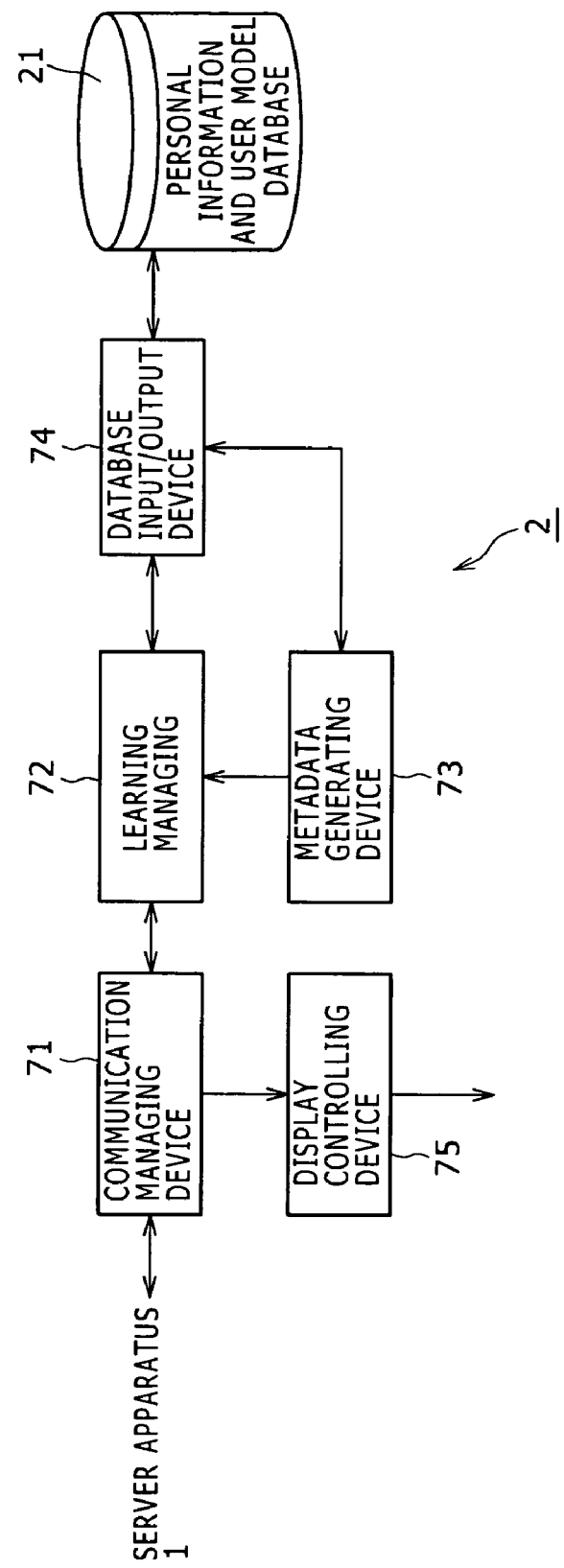
FIG. 6 is a block diagram showing a typical functional structure of the user apparatus.

FIG. 6 is a block diagram showing a typical functional structure of the user apparatus 2. The functional devices shown in FIG. 6 are implemented at least partially by the CPU 31 in FIG. 4 as it carries out appropriate programs.

A communication managing device 71 controls the communication unit 39 and manages communications with the server apparatus 1. Illustratively, the communication managing device 71 receives the sample list coming from the server apparatus 1 and outputs the received list to a learning device 72. Upon receipt of the result of the sample list evaluation from the learning device 72, the communication managing device 71 transmits the received result to the server apparatus 1.

The learning device 72 acquires the user's preferences by historically associating the metadata about the contents that were reproduced or otherwise utilized by the user apparatus 2 with details of the user's behavior (e.g., conscious expression of likes and dislikes in the form of input to the user apparatus 2, and unconscious operations such as skipping over the content being reproduced). When a user model representative of the user's preference information has been obtained in this manner, that model is stored into the personal information and user model database 21 via a database input/output device 74. The metadata about the contents that were reproduced or otherwise used by the user apparatus 2 is supplied from a metadata generating device 73.

When supplied with a sample list from the communication managing device 71, the learning device 72 evaluates the received sample list by scoring and/or classifying the individual contents in the sample list based on the metadata in the list and on the relevant user preferences retrieved from the personal information and user model database 21, as shown in FIG. 3A. The score and/or classification information attached to the listed contents is associated with the identifiers of the contents to form a list that carries the result of the evaluation.

The evaluation result generated by the learning device 72 is output to the communication managing device 71. From the communication managing device, the result is transmitted to the server apparatus 1.

The evaluation result may be checked and edited by the user before being sent to the server apparatus 1. Where the personal information and user model database 21 retains the preference information about a plurality of users, the sample list may be evaluated per user.

The metadata generating device 73 generates metadata about the contents that were handled by the user apparatus 2 and outputs the generated metadata to the learning device 72. The metadata generating device 73 generates metadata using the same algorithm as that used by the metadata generating device 73 in the server apparatus 1. If the communication protocol in use is common to both the server and the user apparatus, any apparatus capable of generating metadata using the same algorithm as that of the server apparatus 1 may act as the user apparatus 2 that can make use of the services provided by the system business operator.

The database input/output device 74 is connected to the personal information and user model database 21. In operation, the database input/output device 74 manages reading and writing of data to and from the personal information and user model database 21.

A display controlling device 75 causes the output unit 37 to display a content list derived from the display information that is supplied from the communication managing device 71. The display controlling device 75 also causes the output unit 37 to display details of the content selected from the content list.

What follows is a description of typical processes performed by the server apparatus 1 and user apparatus 2 structured as explained above. The process carried out by the server apparatus 1 is the first to be described in reference to the flowchart of FIG. 7.

When a trigger is input in step S1, step S2 is reached. In step S2, the sample list generating device 52 generates a sample list to be transmitted to the user apparatus 2.

With the sample list generated, the sample list generating device 52 goes to step S3. In step S3, the sample list generating device 52 causes the communication managing device 51 to transmit the generated sample list to the user apparatus 2. The user apparatus 2 evaluates the transmitted sample list and returns the result of the evaluation to the server apparatus 1.

In step S4, the result of the evaluation is received by the communication managing device 51. The communication managing device 51 forwards the received evaluation result to the selecting device 55.

In step S5, the selecting device 55 determines the user's preferences based on the evaluation result and metadata fed from the communication managing device 51, and selects from the contents in the content database 11 those deemed to be favored by the user according to the determined preferences. The contents thus selected by the selecting device 55 are output to the communication managing device 51.

In step S6, the communication managing device 51 sends to the user apparatus 2 display information for displaying the contents selected by the selecting device 55. The communication managing device 51 then terminates the process of the user apparatus 2.

Figure 8:
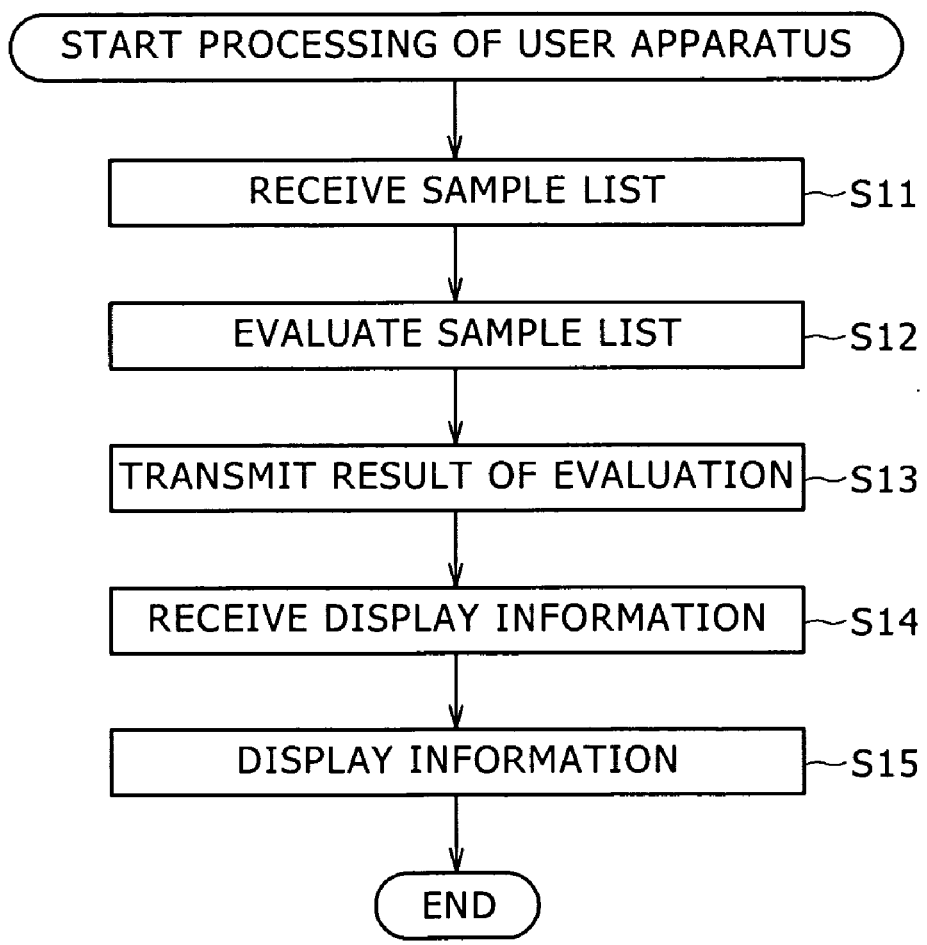
FIG. 8 is a flowchart of steps constituting a typical process performed by the user apparatus.

The process performed by the user apparatus 2 will now be described by referring to the flowchart of FIG. 8. In step S11, the communication managing device 71 receives the sample list sent from the server apparatus 1, and forwards the received sample list to the learning device 72.

In step S12, the learning device 72 evaluates the sample list based on the metadata included in the sample list sent from the server apparatus 1 and on the user preferences retrieved from the personal information and user model database 21.

With the sample list evaluated, step S13 is reached. In step S13, the learning device 72 causes the communication managing device 71 to transmit the result of the evaluation to the server apparatus 1. Upon receipt of the transmitted evaluation result, the server apparatus 1 selects accordingly the contents to be provided to the user, and sends to the user apparatus 1 the display information for displaying the selected contents.

In step S14, the communication managing device 71 receives the display information that has been transmitted.

The received display information is forwarded from the communication managing device 71 to the display controlling device 75.

In step S15, the display controlling device 75 displays illustratively a list of individual contents on the display unit 37 on the basis of the display information sent from the communication managing device 71. The display controlling device 75 then terminates the process of the user apparatus 1. The user can verify the individual contents from the displayed list.

The processing outlined above makes it possible for the server apparatus 1 to provide the user apparatus 2 with the contents conforming to the user's preferences even if personal information about the user is not registered with the server in advance.

Figure 9:
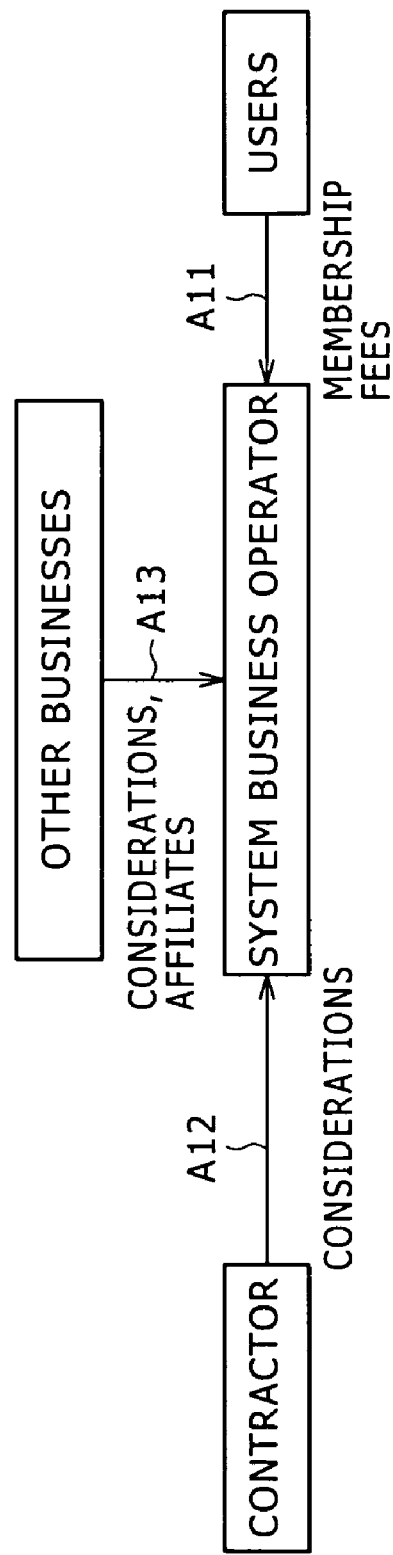
FIG. 9 is a schematic view showing a business model applicable to the invention.

FIG. 9 is a schematic view showing a business model that may be deployed by use of the contents that are provided in the manner described above. For example, as indicated by an arrow A11 in FIG. 9, the system business operator can receive membership fees from each user for the contents to be provided to the user who has registered his or her personal information (in the personal information database 12 shown in FIG. 5). As described above, the server apparatus 1 can provide the user having registered the personal information with more accurately selected contents than users who have not registered their personal information.

The system business operator can also make money by selling items (including contents such as services and pieces of music) to the user on a screen displayed on the user apparatus 2 proposing the contents such as advertisements and promotions personalized to reflect the user's preferences.

In addition, as indicated by an arrow A12, the system business operator may contract with other businesses, cause the user apparatus 2 to display the advertisements and promotions transmitted under contract with such businesses, and receive compensations for the display from the contract parties. Illustratively, the amount of considerations is determined on the basis of the number of times the advertisements and promotions are displayed by the user apparatus 2 and the length of time in which the display has continued.

Furthermore, as indicated by an arrow A13, the system business operator may tie up with other businesses selling articles, let the user be guided to these companies' sales sites via links embedded in the recommendations and advertisements presented to the user on the user apparatus 2, and receive considerations in the form of affiliates.

In the above case, a scheme is provided under which each of the tie-up businesses identifies itself as a legitimate party to the services provided by this system business operator. The scheme may involve the following arrangements:

(1) The sites to which users are guided through links are arranged to include a special site that can be accessed for confirmation from the contents offered by the system business operator. Additional measures may be provided as needed for authentication.

(2) The URL (Uniform Resource Locator) to be displayed on the user apparatus 2 is arranged to include an identifier for identifying the system business operator.

(3) A URL redirection is utilized.

(4) Cookies are used.

The amount of considerations paid illustratively in the form of affiliates by other businesses to the system business operator is determined on the basis of how many users have actually been led to the sites and how much they have actually bought at the sites.

Furthermore, as also indicated by the arrow A13, the system business operator may enable other businesses (i.e., servers managed by other business operators) that offer their own services to their users to utilize this system and allow these users to take advantage of the services of this system. The system business operator receives compensations from these businesses for such usages. In other words, the system business operator may act as an application service provider (ASP). In this case, the server apparatus managed by any of these other businesses corresponds to the user apparatus 2 shown in FIG. 1. The amount of compensations is determined illustratively on the basis of the quantities of the services utilized by the users (i.e., number of transactions).

Figure 10:
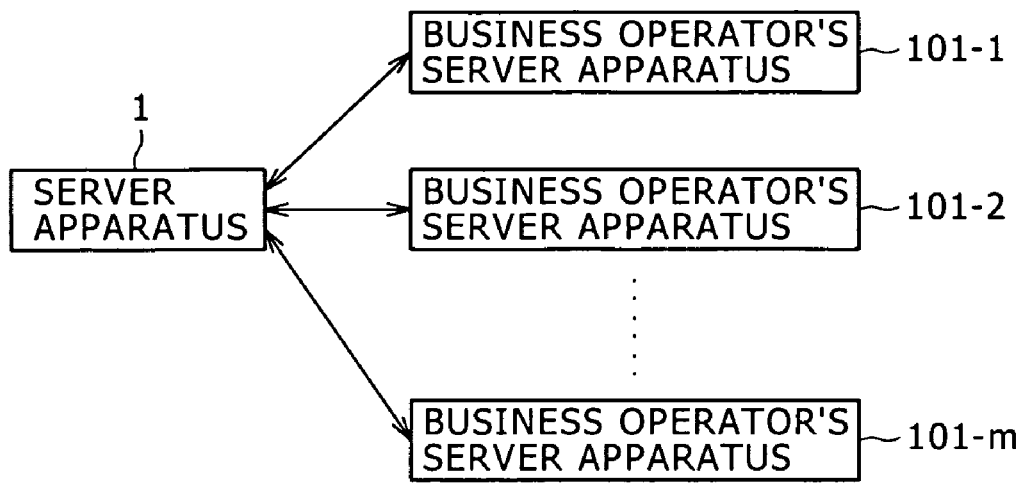
FIG. 10 is a block diagram showing another configuration of the server-client system to which the present invention is applied.

FIG. 10 is a block diagram showing another configuration of the server-client system to which the present invention is applied. The configuration of FIG. 10 is one in which the system business operator acts as an ASP offering its services to other business operators' server apparatuses 101-1 through 101-m connected to the server 1 via a network.

In the above setup, the server apparatus 1 provides the servers 101-1 through 101-m run by a plurality of business operators with common services or with services that are tailored for the services offered by these business operators. The tailored services involve providing the business operators with individually adjusted contents or with contents based on specific advertisement databases.

The business operators' server apparatuses 101-1 through 101-m retain personal information about the users to whom the servers provide their services. Illustratively, the business operators' servers send to the server apparatus 1 the personal information about the users requesting content offerings from these servers (i.e., the users are represented by the user apparatuses accessing the business operators' server apparatuses 101-1 through 101-m via the network). Given the personal information, the server apparatus 1 is prompted to select contents conforming to the preferences of the requesting users and transmit the selected content to their user apparatuses. This is how the contents tailored for the accessing users' preferences are selected and offered by the server apparatus 1.

In the case of the server-client system in FIG. 10, users and their apparatuses are assumed to be authenticated as a rule by the business operators' server apparatuses 101-1 through 101-m to which the users gain direct access. Alternatively, the server apparatus 1 may take over the authentication chore. As another alternative, each of the business operators' server apparatuses 101-1 through 101-m may be equipped with only the capability of repeating (as a proxy) the services offered by the system business operator.

Figure 11:
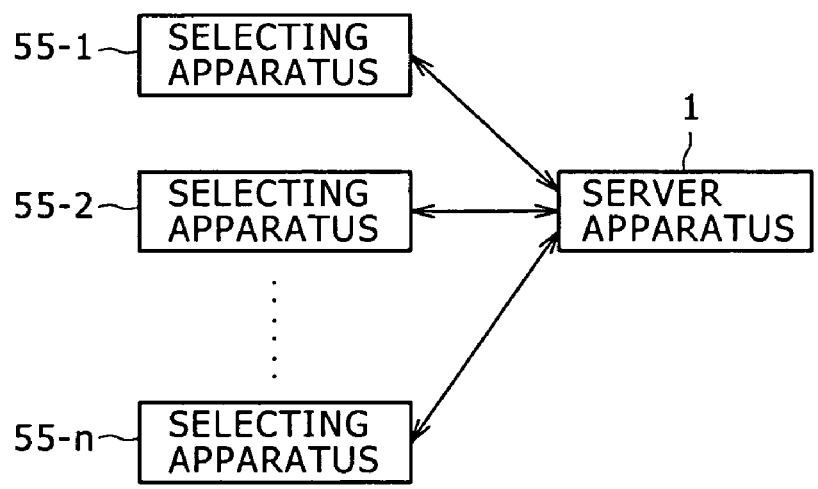
FIG. 11 is a block diagram showing yet another configuration of the server-client system to which the invention is applied.

FIG. 11 is a block diagram showing yet another configuration of the server-client system to which the invention is applied. The configuration of FIG. 11 is one in which the selecting device 55 in the server apparatus 1 of FIG. 5 is replaced by a plurality of externally furnished selecting devices 55-1 through 55-n each corresponding to one of the services to be selected. That is, each selecting device 55 may be installed outside the server apparatus 1 as a selector representative of each selectable service. Communications between the selecting devices 55-1 through 55-n on the one hand and the server apparatus 1 on the other hand are conducted in accordance with a general-purpose protocol such as HTTP or in keeping with a dedicated protocol.

The system in FIG. 11 is constituted by the multiple selecting devices 55-1 through 55-n connected to the single server apparatus 1. Alternatively, the system may be formed by one selecting device connected to a plurality of server apparatuses. In this case, requests (for selected contents) coming from the multiple servers are handled by the single selecting device.

In the examples discussed above, the results of evaluations of the sample lists transmitted to the user apparatus were shown used by the server apparatus 1 in selecting the contents to be offered. Alternatively, the evaluation results may be utilized for various research purposes.

For example, the same sample list (i.e., research target) may be sent to and evaluated by a plurality of user apparatuses 2 having acquired their own user models through learning. The results of the evaluations are then collected and compiled in order to find degrees of statistical conformity of the users to the sample list. The user apparatuses 2 as the destinations for transmission of the sample list may be selected either randomly or by group if personal information has been registered in advance. That is, the users may be classified into target groups by their personal attributes such as age and sex. Any one of these particular user groups may be selected for research purposes.

The series of steps and processes described above may be executed either by hardware or by software. For the software-based processing to take place, the programs constituting the software may be either incorporated beforehand in dedicated hardware of a computer or installed upon use over a network or from a suitable recording medium into a general-purpose personal computer or like equipment capable of executing diverse functions based on the installed programs.

As shown in FIG. 4, the recording medium is offered to users not only as one of the removable media 41 apart from their apparatuses and constituted by magnetic disks (including flexible disks), optical disks (including CD-ROM (Compact Disk-Read Only Memory) and DVD (Digital Versatile Disk)), magneto-optical disks (including MD (Mini-Disk; registered trademark)), or semiconductor memories, each medium carrying the necessary programs; but also in the form of the ROM 32 and the hard disk drive contained in the storage unit 38, both accommodating the programs and incorporated beforehand in the apparatuses.

In this specification, the steps which describe the programs to be executed represent not only the processes that are to be carried out in the depicted sequence (i.e., on a time series basis) but also processes that may be performed parallelly or individually and not chronologically.

In this specification, the term "system" refers to an entire configuration made up of a plurality of component devices.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing system comprising:
    an information providing apparatus and an information processing apparatus interconnected via a network;
    wherein the information providing apparatus includes:
        generating means for generating sample content data including content identifiers for identifying individual content in a set of contents selected from a content database and metadata for the indentified individual content associated with the content identifier for the identified individual content, before transmitting the generated sample content data to the information processing apparatus;
        deriving means for deriving preferences of a user of the information processing apparatus from a result of an evaluation of the sample content data received from the information processing apparatus;
        selecting means for selecting contents from the content database based on the preferences of the user of the information processing apparatus derived from the result of evaluation of the sample content data; and
communication means
(i) for transmitting, to the information processing apparatus, the generated sample content data,
(ii) for receiving, from the information processing apparatus, the result of the evaluation of the sample content data, and
(iii) for transmitting, to the information processing apparatus, the contents selected from the content database based on the preferences of the user of the information processing apparatus derived from the result of evaluation of the sample content data; and
wherein the information processing apparatus includes:
evaluating means for evaluating the individual content in the set of contents in the sample content data based on the metadata associated with the individual content and in accordance with user preferences stored on the information processing apparatus, before transmitting the result of the evaluation to the information providing apparatus; and
output controlling means for outputting the contents which have been transmitted from the information providing apparatus after being selected thereby based on the user preferences derived from the evaluation result.

2. An information providing apparatus for providing contents to an information processing apparatus connected via a network, the information providing apparatus comprising:
generating means for generating sample content data including content identifiers for identifying individual content in a set of contents selected from a content database and metadata for the indentified individual content associated with the content identifier for the identified individual content, before transmitting the generated sample content data to the information processing apparatus;
deriving means for deriving preferences of a user of the information processing apparatus from a result of an evaluation of the sample content data received from the information processing apparatus;
selecting means for selecting contents from the content database based on the preferences of the user of the information processing apparatus derived from the result of evaluation of the sample content data; and
communication unit
(i) for transmitting, to the information processing apparatus, the generated sample content data,
(ii) for receiving, from the information processing apparatus, the result of the evaluation of the sample content data, and
(iii) for transmitting, to the information processing apparatus, the contents selected from the content database based on the preferences of the user of the information processing apparatus derived from the result of evaluation of the sample content data.

3. The information providing apparatus according to claim 2, further comprising:
storing means for storing personal information offered by the user of the information processing apparatus;
wherein the deriving means determines the user preferences based on the result of evaluation of the sample content data and on the personal information stored in the storing means.

4. An information providing method for use with an information providing apparatus for providing contents to an information processing apparatus connected via a network, the information providing method comprising:
generating sample content data including content identifiers for identifying individual content in a set of contents selected from a content database and metadata for the indentified individual content associated with the content identifier for the identified individual content, before transmitting the generated sample content data to the information processing apparatus;
deriving preferences of a user of the information processing apparatus from a result of an evaluation of the sample content data received from the information processing apparatus;
selecting contents from the content database based on the preferences of the user of the information processing apparatus derived from the result of evaluation of the sample content data;
transmitting, to the information processing apparatus, the generated sample content data;
receiving, from the information processing apparatus, the result of the evaluation of the sample content data; and
transmitting, to the information processing apparatus, the contents selected from the content database based on the preferences of the user of the information processing apparatus derived from the result of evaluation of the sample content data.

5. A non-transitory computer-readable medium storing a program configured to execute a method for providing contents to an information processing apparatus connected via a network, the method comprising:
generating sample content data including content identifiers for identifying individual content in a set of contents selected from a content database and metadata for the indentified individual content associated with the content identifier for the identified individual content, before transmitting the generated sample content data to the information processing apparatus;
deriving preferences of a user of the information processing apparatus from a result of an evaluation of the sample content data received from the information processing apparatus;
selecting contents from the content database based on the preferences of the user of the information processing apparatus derived from the result of evaluation of the sample content data;
transmitting, to the information processing apparatus, the generated sample content, data;
receiving, from the information processing apparatus, the result of the evaluation of the sample content data; and
transmitting, to the information processing apparatus, the contents selected from the content database based on the preferences of the user of the information processing apparatus derived from the result of evaluation of the sample content data.

6. An information processing apparatus connected to an information providing apparatus via a network, the information processing apparatus comprising:
communication unit
(i) for receiving, from the information providing apparatus, generated sample content data including content identifiers for identifying individual content in a set of contents selected from a content database and metadata for the indentified individual content associated with the content identifier for the identified individual content, (ii) for transmitting, to the information providing apparatus, a result of an evaluation of the sample content data, and (iii) for receiving, from the information providing apparatus, contents selected from a content database based on preferences of a user of the information processing apparatus derived from the result of evaluation of the sample content data;

evaluating means for evaluating the individual content in the set of contents in the sample content data based on the metadata associated with the individual content and in accordance with the user preferences stored on the information processing apparatus, before transmitting the result of the evaluation to the information providing apparatus; and output controlling means for outputting the contents which have been transmitted from the information providing apparatus after being selected thereby based on the user preferences derived from the evaluation result.

7. The information processing apparatus according to claim 6, wherein the evaluating means evaluates the sample content data using the user preferences obtained by a learning process based at least on either of an operation history of the user or information input by the user.

8. An information processing method for use with an information processing apparatus connected to an information providing apparatus via a network, the information processing method comprising:

receiving sample content data from the information providing apparatus via the network using a receiver of the information processing apparatus;

evaluating individual content in a set of contents in the sample content data based on metadata associated with the individual content and in accordance with user preferences stored on the information processing apparatus, before transmitting a result of the evaluation to the information providing apparatus;

transmitting, to the information providing apparatus, the result of the evaluation of the sample content data;

receiving, from the information providing apparatus, contents selected from a content database based on preferences of a user of the information processing apparatus derived from the result of evaluation of the sample content data; and outputting the contents which have been transmitted from the information providing apparatus after being selected thereby based on the user preferences derived from the evaluation result.

9. A non-transitory computer-readable medium storing a program configured to execute a method of an information processing apparatus connected to an information providing apparatus via a network, the method comprising:

receiving sample content data from the information providing apparatus via the network;

evaluating individual content in a set of contents in the sample content data based on metadata associated with the individual content and in accordance with user preferences stored on the information processing apparatus, before transmitting a result of the evaluation to the information providing apparatus;

transmitting, to the information providing apparatus, a result of an evaluation of the sample content data;

receiving, from the information providing apparatus, contents selected from a content database based on preferences of a user of the information processing apparatus derived from the result of evaluation of the sample content data; and outputting the contents which have been transmitted from the information providing apparatus after being selected thereby based on the user preferences derived from the evaluation result.

10. An information processing system comprising an information providing apparatus and an information processing apparatus interconnected via a network;

wherein the information providing apparatus includes:

a generating device generating sample content data including content identifiers for identifying individual content in a set of contents selected from a content database and metadata for the indentified individual content associated with the content identifier for the identified individual content, before transmitting the generated sample content data to the information processing apparatus;

a deriving device deriving preferences of a user of the information processing apparatus from a result of an evaluation of the sample content data received from the information processing apparatus;

a selecting device selecting contents from the content database based on the preferences of the user of the information processing apparatus derived from the result of evaluation of the sample content data; and communication device (i) for transmitting, to the information processing apparatus, the generated sample content data, (ii) for receiving, from the information processing apparatus, the result of the evaluation of the sample content data, and (iii) for transmitting, to the information processing apparatus, the contents selected from the content database based on the preferences of the user of the information processing apparatus derived from the result of evaluation of the sample content data; and wherein the information processing apparatus includes:

an evaluating device evaluating the individual content in the set of contents in the sample content data based on the metadata associated with the individual content and in accordance with user preferences stored on the information processing apparatus, before transmitting the result of the evaluation to the information providing apparatus; and an output controlling device outputting the contents which have been transmitted from the information providing apparatus after being selected thereby based on the user preferences derived from the evaluation result.

11. An information providing apparatus for providing contents to an information processing apparatus connected via a network, the information providing apparatus comprising:

a generating device generating sample content data including content identifiers for identifying individual content in a set of contents selected from a content database and metadata for the indentified individual content associated with the content identifier for the identified individual content, before transmitting the generated sample content data to the information processing apparatus;

a deriving device deriving preferences of a user of the information processing apparatus from a result of an evaluation of the sample content data received from the information processing apparatus;

a selecting device selecting contents from the content database based on the preferences of the user of the information processing apparatus derived from the result of evaluation of the sample content data; and communication device (i) for transmitting, to the information processing apparatus, the generated sample content data, (ii) for receiving, from the information processing apparatus, the result of the evaluation of the sample content data, and (iii) for transmitting, to the information processing apparatus, the contents selected from the content database based on the preferences of the user of the information processing apparatus derived from the result of evaluation of the sample content data.

12. The information providing apparatus according to claim 11, further comprising:

a storing device storing personal information offered by the user of the information processing apparatus;

wherein the providing device determines the user preferences based not only on the result of evaluation of the sample content data but also on the personal information stored in the storing device.

13. An information processing apparatus connected to an information providing apparatus via a network, the information processing apparatus comprising:

communication unit (i) for receiving, from the information providing apparatus, generated sample content data including content identifiers for identifying individual content in a set of contents selected from a content database and metadata for the indentified individual content associated with the content identifier for the identified individual content, (ii) for transmitting, to the information providing apparatus, a result of an evaluation of the sample content data, and (iii) for receiving, from the information providing apparatus, contents selected from a content database based on preferences of a user of the information processing apparatus derived from the result of evaluation of the sample content data;

an evaluating device evaluating the individual content in the set of contents in the sample content data based on the metadata associated with the individual content and in accordance with user preferences stored on the information processing apparatus, before transmitting the result of the evaluation to the information providing apparatus; and an output controlling device outputting the contents which have been transmitted from the information providing apparatus after being selected thereby based on the user preferences derived from the evaluation result.

14. The information processing apparatus according to claim 13, wherein the evaluating device evaluates the sample content data using the user preferences obtained by a learning process based at least on either of an operation history of the user or information input by the user.

* * * * *